US008991015B2

(12) United States Patent
Piermayr et al.

(10) Patent No.: US 8,991,015 B2
(45) Date of Patent: Mar. 31, 2015

(54) CLOSURE FOR THE NON-DETACHABLE CONNECTION OF TWO ENDS OF A PREFERABLY TEXTILE BAND

(71) Applicant: Harald Platzer GmbH, Vienna (AT)

(72) Inventors: Michael Piermayr, Vienna (AT); Christian Piermayr, Vienna (AT)

(73) Assignee: Harald Platzer GmbH., Vienna (AT)

( * ) Notice: Subject to any disclaimer, the term of this patent is extended or adjusted under 35 U.S.C. 154(b) by 243 days.

(21) Appl. No.: 13/644,722

(22) Filed: Oct. 4, 2012

(65) Prior Publication Data

US 2013/0097813 A1 Apr. 25, 2013

(30) Foreign Application Priority Data

Oct. 20, 2011 (AT) ................................ GM568/2011

(51) Int. Cl.
*F16G 11/14* (2006.01)
*G09F 3/00* (2006.01)
*G09F 3/03* (2006.01)

(52) U.S. Cl.
CPC .............. *G09F 3/005* (2013.01); *G09F 3/0305* (2013.01)
USPC .... 24/136 R; 24/136 L; 24/115 R; 24/115 M; 24/115 H; 24/115 K

(58) Field of Classification Search
CPC ................................ F16G 11/04; F16G 15/02
USPC ...... 24/136 L, 115 H, 115 K, 136 R, 134 KB, 24/115 G; 292/325, 323, 317, 320; 606/232
See application file for complete search history.

(56) References Cited

U.S. PATENT DOCUMENTS

2004/0098050 A1 * 5/2004 Foerster et al. ............... 606/232

FOREIGN PATENT DOCUMENTS

AT 9355 8/2007

* cited by examiner

*Primary Examiner* — Jack W Lavinder
(74) *Attorney, Agent, or Firm* — Kagan Binder, PLLC

(57) ABSTRACT

In a closure for the non-detachable connection of two ends of a preferably textile band by which means the size of the loop formed by the band can be reduced but not enlarged by sliding the closure along the parallel-running band ends, wherein the closure includes an insertion part having at least one insert carrying a tip and an outer sleeve, which has a first opening and a second opening for passage of the band, wherein the first opening is surrounded by a stop for the insertion part with insert and the dimensioning of the second opening allows the insertion of the insertion part with the insert, it is provided that the insertion part has a recess for receiving the insert at its end facing the first opening and the stop of the outer sleeve.

13 Claims, 3 Drawing Sheets

CLOSURE FOR THE NON-DETACHABLE CONNECTION OF TWO ENDS OF A PREFERABLY TEXTILE BAND

CROSS-REFERENCE TO RELATED APPLICATIONS

This application claims priority under 35 U.S.C. §119 to Austrian application filed on Oct. 20, 2011 and having serial number GM 568/2011, wherein the entirety of said application is incorporated herein by reference.

FIELD OF THE INVENTION

The invention relates to a closure for the non-detachable connection of two ends of a preferably textile band by which means the size of the loop formed by the band can be reduced but not enlarged by sliding the closure along the parallel-running band ends.

BACKGROUND OF THE INVENTION

In many applications it is desirable to join together the ends of a band non-detachably but to be able to further reduce the loop formed by the band after joining. However, an enlargement of the loop should no longer be possible without destroying the closure.

Textile bands with such closures are used, for example, in multi-day events and are used as non-transferrable “entry cards” into the site or sites of the event. After payment of the entry price, the visitor to the event receives a textile band that is already joined with a closure at its ends but forms a still-large loop, the visitor pushes his hand through the loop and the closure is displaced on the band in order to adapt the size of the loop to the circumference of the visitor’s wrist so that the visitor can no longer pull his hand out from the loop. After this adaptation, it should no longer be possible to push the closure back so that the visitor can only take off the band by cutting through the band or by destroying the closure. Transfer of the entry authorisation is therefore eliminated.

One of the first designs of such entry authorisation bands had a simple metal sleeve as closure which, after adaptation of the loop to the desired size, was deformed with a corresponding tool in order to clamp the ends of the band at this point. A disadvantage of this solution is that a tool is required for closing and for fixing the position of the closure and that it comes down to the force during deformation of the sleeve as to how resistant the clamping connection is.

Another known embodiment consists of an outer sleeve and an insertion body that can be engaged with this, which carries two needles whose tips are aligned to the ends of the band parallel to the axis of rotation of the outer sleeve and when attempting to slide the sleeve with the insertion body towards the ends of the band, is intended to engage in the textile band. However, this embodiment is complex to manufacture and allows a certain displacement before stopping. Also the percentage of malfunctions is not satisfactory.

Another prior-art closure is described in the Austrian Utility Model No. 9355 in which the insertion part consists of two semi-cylindrical insertion part elements interconnected by means of a web, which carry metal plates with tips on the mutually facing surfaces. As a result of the number of insertion parts and the flexible web, difficulties during assembly can occur with this closure.

SUMMARY OF THE INVENTION

It is an object of the present invention to improve the closure of the type specified initially so that it contains fewer individual parts, is easy and problem-free to mount and nevertheless allows only minimal displacement in the direction of the ends of the band if at all and avoids malfunctions.

The object is solved in a closure described initially whereby the insertion part has a recess for receiving the insert at its end facing the first opening and the stop of the outer sleeve. For insertion of the insert with the at least one tip, the insertion part must therefore no longer be opened or folded apart and its therefore a more stable element. The insert is retained between outer sleeve and insertion part since the recess in the insertion part faces the stop of the outer sleeve.

The recess is preferably a groove running through the insertion part transversely to the direction of displacement of the closure, which is easy to produce and enables the insert to be introduced into the recess in the direction of displacement in precisely the same way as transversely thereto.

Advantageously, the insertion part comprises a central bore running parallel to the direction of displacement, which is concentric with the two openings of the outer sleeve. In addition, an aperture can be provided in the insert, which at least partially overlaps with the first opening of the outer sleeve. The band ends can thus go straight through the first opening in the outer sleeve, the aperture in the insertion part, the central bore and the second opening of the outer sleeve.

According to a preferred embodiment, the insert comprises two legs extending in the direction of displacement, of which at least one carries one or more tips, preferably two or three tips and a connecting section which connects the legs and extends parallel to the plane of the stop of the outer sleeve. With this structure the connecting section is supported on the stop of the outer sleeve and the legs are supported on the side walls of the recess and the tips extend parallel or at an acute angle to the direction of displacement. If each leg has at least one, preferably two tips, the band ends are held securely from two sides.

Preferably, the tip or tips extends or extend from the planes of the legs extending parallel to the direction of displacement towards the longitudinal central plane of the closure, i.e. run at an acute angle to the direction of displacement and narrow the passage between the legs. The tip or tips are thereby positioned in the centre of the closure and engagement of the tip or tips in the material of the belt is ensured.

The aperture extends over a part of the connecting section and preferably over a part of the legs so that the band ends can be guided simply through the aperture.

The insert is preferably stamped from a leaf-shaped material such as, preferably a metal sheet, including the aperture, and the legs, the connecting section and the one or more tips are brought into their positions with respect to one another by deforming. Such an insert is inexpensive and easy to manufacture.

According to a preferred embodiment, the tip or the tips extends or extend into the central bore of the insertion part. The wall of the bore can additionally displace the tip(s) towards the longitudinal central plane of the closure so that an even more secure penetration of the tip(s) into the textile material of the band ends is ensured.

Advantageously, one or more tips are provided on both legs, the tip(s) of one leg is or so are offset with respect to the tip(s) of the other leg. It can thus be avoided that two tips of the insert lie precisely opposite one another, on the contrary the tips come to lie adjacent to one another or engage in one another and thus guarantee good penetration into the band ends.

BRIEF DESCRIPTION OF THE DRAWINGS

The invention will now be explained with reference to the appended drawings which show a preferred embodiment of the invention.

DETAILED DESCRIPTION OF THE PREFERRED EMBODIMENTS

Figure 1:
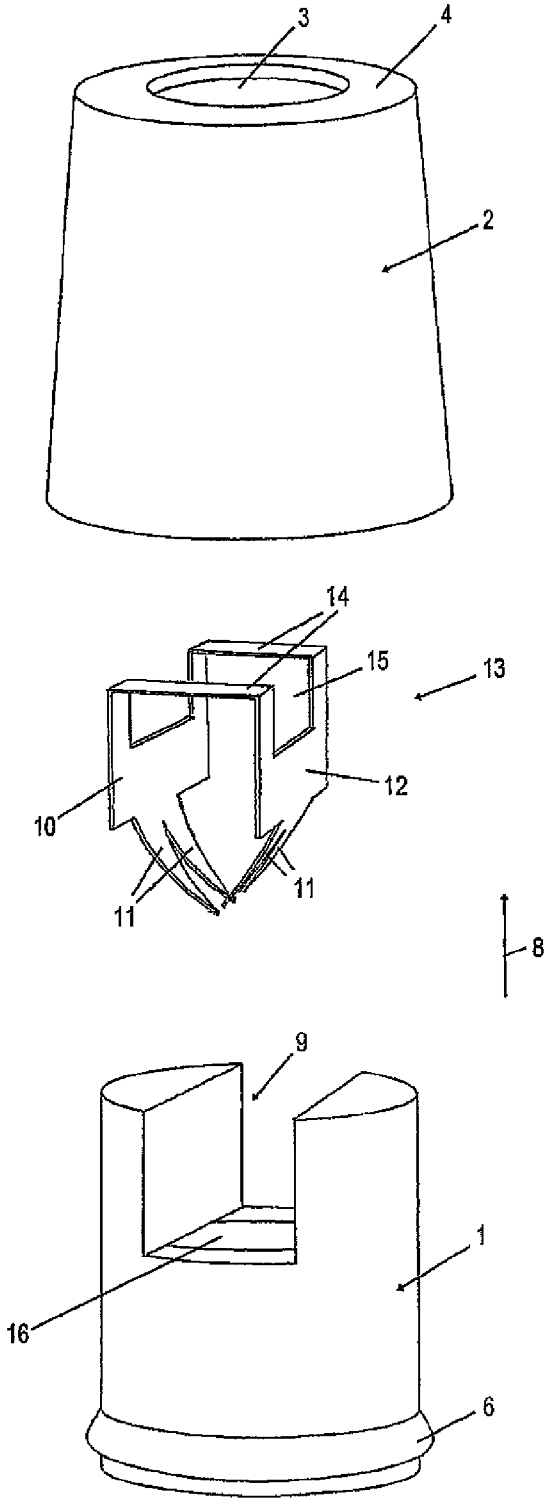
FIG. 1 shows the outer sleeve 2, the insert 13 and the insertion part 1 before assembly in an oblique view from above.
Figure 2:
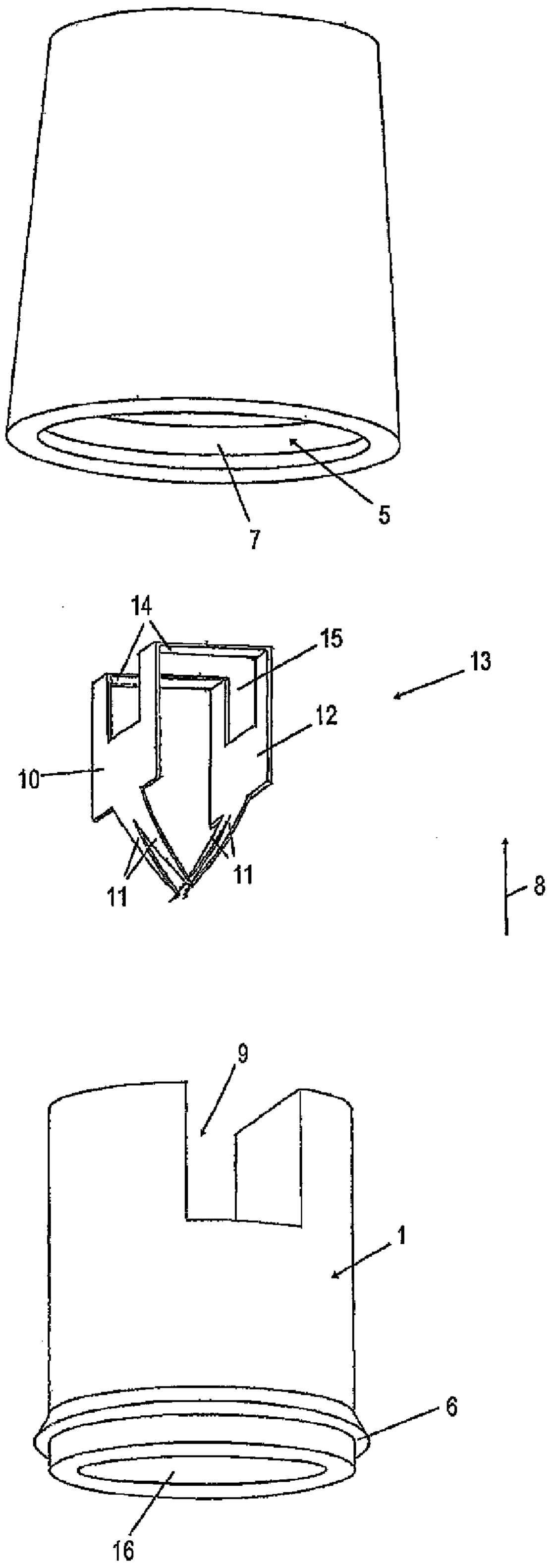
FIG. 2 shows the outer sleeve 2, the insert 13 and the insertion part 1 before assembly in an oblique view from below.
Figure 3:
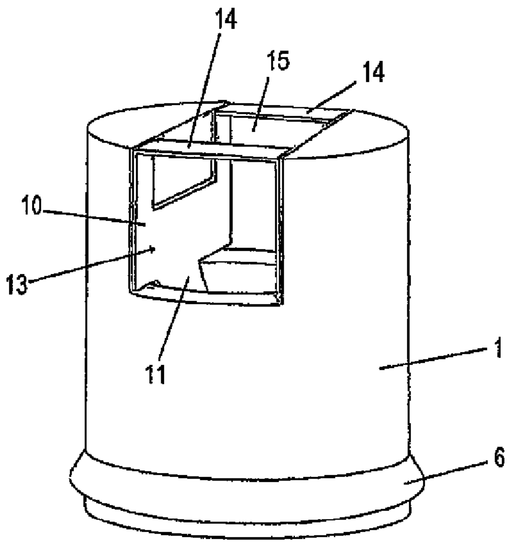
FIG. 3 shows the insertion part 1 with inserted insert 13 in an oblique view from above.

As can be seen in FIG. 1 and FIG. 2, the insertion part 1 is cylindrical and the outer sleeve 2 is a slightly frustroconical sleeve with two openings 3, 5. Due to the rotational symmetry, the insertion part 1 can be inserted into the outer sleeve in any angular position.

The diameter of the first opening 3 is smaller than the diameter of the insertion part 1. After complete insertion of the insertion part 1 into the outer sleeve 2 in the direction of displacement (arrow 8), the insertion part 1 rests on the stop 4 and the first latching element 6 on the insertion part 1 engages in the second latching element 7 on the outer sleeve 2.

Figure 4:
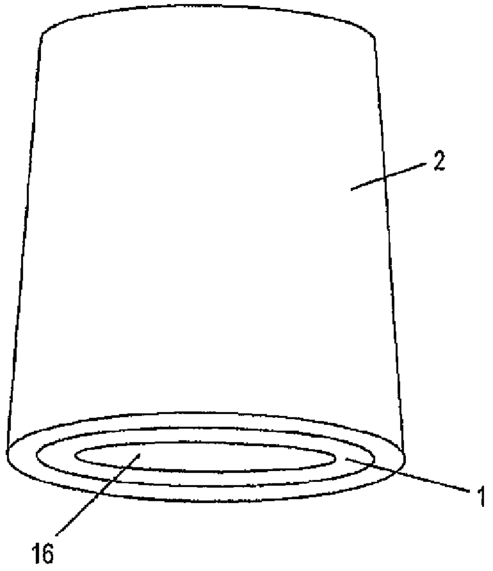
FIG. 4 shows the outer sleeve 2 with inserted insertion part 1 in an oblique view from below.

The insert 13 has two legs 10, 12 which are interconnected by means of a connecting section 14. An aperture 15 extends over the connecting section 14 and partially over the legs 10, 12. On the side of the legs 10, 12 facing away from the connecting section 14, these legs each go over into tips 11 which are offset with respect to one another so that the tips 11 of the two legs 10, 12, particularly when the legs 10, 12 are additionally bent inwards, lie alternately in the longitudinal central plane of the closure. Such an optionally elastic bending can, for example, take place when the insert 1 is inserted in the recess of the insertion part 1, which is here configured as groove 9. The narrow strips of the connecting section 14 enable an elastic bending when the legs 10, 12 slide along the walls of the groove 9 into the groove 9. In the inserted state of the insert 1, the tips 11 project into the central bore 16 of the insertion part, as can be seen in FIG. 4.

For attachment of the closure to the band, which is not shown for the sake of clarity, the band is laid to form a loop and the outer sleeve is thus threaded onto the folded belt so that the loop projects from the opening 3 and the band ends project from the opening 5. The band ends are then guided through the aperture 15 and between the tips 11. Optionally, by pressing on the legs 10, 12 the distance between the tips 11 can be further reduced, which distance can be even larger than that shown in the figures for threading in. In this case, the tips 11 can then penetrate readily into the textile material of the band ends. The band ends are guided through the central bore 16 of the insertion part 1 and the insert 1 with the band ends is then inserted into the groove 9 of the insertion part 1. The lower edges of the legs 10, 12 thereby come to rest on the base of the groove 9 at the thickness of the insertion part 1 and the tips project into the central bore 16. The walls of the groove 9 can further compress the legs 10, 12 of the insert 13 and bring the tips 11 closer to one another. Finally the outer sleeve 2 is pushed onto the insertion part 1 until the latching element 6, a rib on the lower outer circumference of the insertion element 7, engages with the latching element 7, an annular recess in the lower inner surface of the outer sleeve 2. The insert 13 is held firmly between the stop 4 of the outer sleeve 2 and the insertion part 1.

The closure is thus fastened to the band which forms a large loop. When used as an access authorisation band, the authorised person can place his hand through the loop and the outer sleeve 2 can be pushed with the engaged insertion part 1 in the direction of the arrow 8, whereby the loop becomes smaller until it is adapted to the wrist size of the authorised person. When attempting to displace the closure against the direction of the arrow 8, i.e. to enlarge the loop, the tips 11 engage in the band and prevent any displacement.

What is claimed is:

1. Closure for the non-detachable connection of two ends of a preferably textile band by which means the size of the loop formed by the band can be reduced but not enlarged by sliding the closure along the parallel-running band ends, wherein the closure comprises an insertion part (1) having at least one insert (13) carrying a tip or tips (11) and an outer sleeve (2), which has a first opening (3) and a second opening (5) for passage of the band, wherein the first opening (3) is surrounded by a stop (4) for the insertion part (1) with insert (13) and the dimensioning of the second opening (5) allows the insertion of the insertion part (1) with the insert (13), wherein a first latching element (6) is provided on the outer side of the insertion part (1), which latching element engages with a second latching element (7) on the inner side of the outer sleeve (2) when the insertion part (1) is fully inserted into the outer sleeve (2), wherein the insertion part (1) comprises a central bore (16) running parallel to the direction of displacement (8), which is concentric with the two openings (3, 5) of the outer sleeve (2), wherein the tip or tips (11) extends or extend into the central bore (16) of the insertion part (1), wherein the insertion part (1) has a recess (9) for receiving the insert (13), wherein the recess (9) has an end facing the first opening (3) and the stop (4) of the outer sleeve (2) to retain the insert (13) between the end of the recess (9) and the stop (4).

2. The closure according to claim 1, wherein the recess (9) is a groove (9) running through the insertion part (1) transversely to the direction of displacement (8) of the closure.

3. The closure according to claim 1, wherein an aperture (15) is provided in the insert (13), which at least partially overlaps with the first opening (3) of the outer sleeve (2).

4. The closure according to claim 3, wherein the insert (13) comprises two legs (10, 12) extending in the direction of displacement (8), of which at least one carries one or more tips (11), and a connecting section (14) which connects the legs (10, 12) and extends parallel to the plane of the stop (4) of the outer sleeve (2).

5. The closure according to claim 4, wherein the tip or the tips (11) extends or extend from the planes of the legs (10, 12) extending parallel to the direction of displacement (8) towards the longitudinal central plane of the closure.

6. The closure according to claim 4, wherein the aperture (15) extends over a part of the connecting section (14).

7. The closure according to claim 6, wherein the aperture (15) extends over a part of the legs (10, 12).

8. The closure according to claim 7, wherein the insert is stamped from a leaf-shaped material, including the aperture (15), and the legs (10, 12), the connecting section (14) and the one or more tips (11) are brought into their positions with respect to one another by deforming.

9. The closure according to claim 8, wherein the material comprises a metal sheet.

10. The closure according to claim 4, wherein if one or more tips (11) are provided on both legs (10, 12), the tip or tips (11) of one leg (10) is or are offset with respect to the tip or the tips (11) of the other leg (12) transversely to the direction of displacement (8).

11. The closure according to claim 4, wherein the at least one comprises two or three tips.

12. A kit for a closure for the non-detachable connection of two ends of a textile band comprising:

an insert having one or more tips to engage and secure the textile band;

an insertion part comprising:

a recess for receiving the insert;

a central bore, wherein the one or more tips can extend into the central bore when the insert is positioned in the recess;

a first latching element on the outer side of the insertion part, an outer sleeve comprising:

a first end, wherein the first end comprises a lid having a first opening, wherein the lid prevents the insert and insertion part from passing through the first end of the outer sleeve;

a second end, wherein the second end has an opening to receive the insertion part and insert, wherein the first opening and second opening allow passage of the band; and a second latching element on the inner side of the outer sleeve, wherein the first latching element engages with the second latching element when the insertion part is fully inserted into the outer sleeve;

wherein the recess of the insertion part further comprises an end facing the lid of the outer sleeve to retain the insert between the end of the recess and the lid.

13. A kit for a closure for the non-detachable connection of two ends of a textile band comprising:

an insert;

an insertion part comprising:

a recess for receiving the insert;

a central bore, wherein the one or more tips can extend into the central bore when the insert is positioned in the recess;

a first latching element on the outer side of the insertion part, an outer sleeve comprising:

a first end, wherein the first end comprises a lid having a first opening, wherein the lid prevents the insert and insertion part from passing through the first end of the outer sleeve;

a second end, wherein the second end has an opening to receive the insertion part and insert, wherein the first opening and second opening allow passage of the band; and a second latching element on the inner side of the outer sleeve, wherein the first latching element engages with the second latching element when the insertion part is fully inserted into the outer sleeve, wherein the insert further comprises:

two legs extending perpendicular to the plane of the lid, wherein at least one leg comprises one or more tips to engage and secure the textile band, and a connecting section that connects the legs and extends parallel to the plane of the lid of the outer sleeve.

* * * * *